March 5, 1957  F. DOVE  2,784,401
AIRCRAFT NAVIGATION-AID APPARATUS
Filed May 21, 1952  3 Sheets-Sheet 1

INVENTOR
FRANK DOVE
BY
Herbert H. Thompson
ATTORNEY.

March 5, 1957
F. DOVE
2,784,401
AIRCRAFT NAVIGATION-AID APPARATUS
Filed May 21, 1952
3 Sheets-Sheet 2
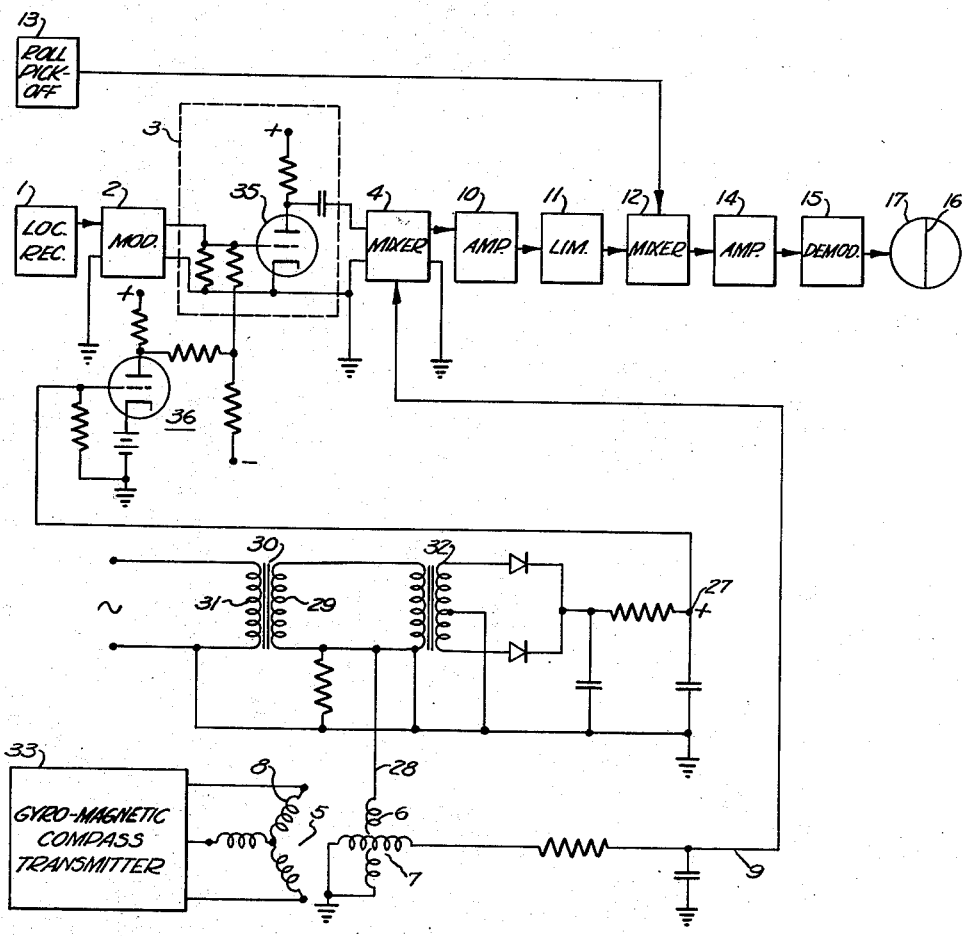
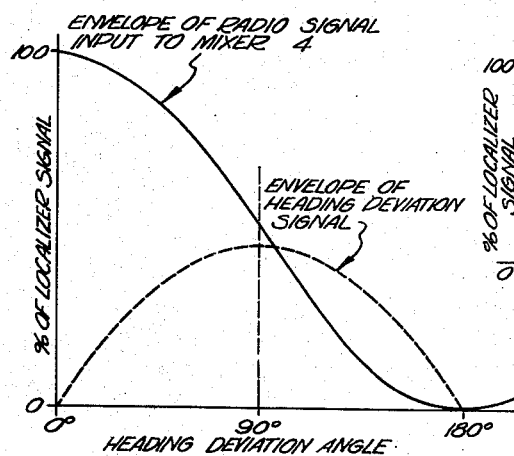
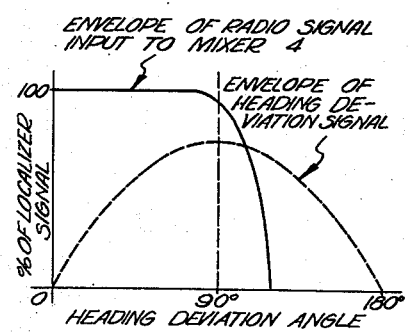
INVENTOR
FRANK DOVE
BY
ATTORNEY March 5, 1957 F. DOVE 2,784,401
AIRCRAFT NAVIGATION-AID APPARATUS
Filed May 21, 1952 3 Sheets-Sheet 3

INVENTOR
FRANK DOVE
BY
ATTORNEY

United States Patent Office 2,784,401
Patented Mar. 5, 1957

2,784,401

AIRCRAFT NAVIGATION-AID APPARATUS

Frank Dove, St. Albans, England, assignor, by mesne assignments, to The Sperry Gyroscope Company, Limited, Brentford, England, a British company Application May 21, 1952, Serial No. 289,124

Claims priority, application Great Britain May 24, 1951

17 Claims. (Cl. 343—107)

This invention relates to apparatus for use in aircraft to enable the aircraft to be steered manually or automatically to approach and follow a ground track defined by radio means external to the aircraft and of the kind operating by virtue of the fact that a resultant control signal is derived in the apparatus as the combination of various control signals including one (hereinafter referred to as the displacement signal) that is generated as a measure of the lateral displacement of the aircraft from the ground track and another (hereinafter referred to as the heading signal) that is generated as a measure of the angular departure of the heading of the aircraft from a predetermined direction generally in the direction of the ground track.

In the case of automatic control apparatus of the kind specified the resultant control signal is applied to operate appropriate devices for applying control moments to the aircraft to control the aircraft automatically to approach the track and proceed along it. An example of such an automatic control is disclosed in the United States Patent No. 2,613,050 to O. E. Esval and assigned to the assignee of the present application. In the case of indicating apparatus of the kind specified the control signal is applied to cause movement of an indicator relative to a reference index for the purpose of assisting the pilot or navigator of the aircraft to steer the aircraft by turning it in the appropriate direction to approach the track and proceed along it. An example of such an indicating system is disclosed in United States Patent No. 2,613,350 to S. Kellogg, 2nd, assigned to the assignee of the present application. The arrangement in the case of indicating apparatus is such that if the aircraft is steered in such a manner that the indicator is maintained at its zero point relative to the reference index it will continuously change its heading until it reaches the ground track and will thereafter proceed along the ground track. This comes about in the following manner: If the aircraft is displaced from the ground track and is flying parallel to the ground track, a displacement signal will be produced but no heading signal. The displacement signal is applied to the indicator to move it relatively to the reference index and thereby indicate to the pilot that a change in heading of the aircraft is required. The pilot turns his aircraft in the appropriate direction indicated by the sense of the displacement signal to head it back towards the track. In consequence of the change of heading there is developed in the apparatus a heading signal opposing the displacement signal. The pilot turns the aircraft until these two signals become equal and opposite as shown by the fact that the indicator registers zero. By continuously steering the aircraft in this way the pilot causes the aircraft to follow closely a path the direction of which at any point is inclined towards the ground track at an angle that progressively becomes smaller as the aircraft approaches the track, thus resulting in an asymptotic approach.

Automatic control apparatus of the kind specified operates in a similar manner but automatically to cause the aircraft to follow a flight path having the above described characteristics.

Apparatus of the kind specified operates satisfactorily to produce the described results if at the time when they are switched into operation the aircraft is not too far displaced from the ground track. However, in such apparatus if the aircraft is initially displaced laterally from the ground track at a large distance from the ground track and the heading of the aircraft is changed in response to the displacement signal so as to cause the aircraft to approach the track and thereby decrease the displacement signal, it can happen that, no matter through what angle the aircraft is turned, the displacement signal still remains larger than even the maximum value that the heading signal can attain. A resultant control signal would thus still be operative in the same sense and would result in a further change in heading of the aircraft in the same sense causing the aircraft to turn continuously in a circle.

Indicating apparatus of the kind referred to intended to be free from this defect has been proposed in which a heading signal is provided by a pick-off device associated with a reference-direction-defining apparatus, the magnitude of the output from the pick-off device varying sinusoidally from zero at 0° to a maximum at 90°, to zero at 180°, and thereafter similarly in the opposite sense from 180° to 360°, a displacement signal is provided by a radio receiver in the aircraft which receives signals from the radio means external to the aircraft, a limiter being incorporated, arranged to limit the maximum value that the magnitude of the displacement signal can attain to a value smaller than the value of the heading signal reached at a heading of 90°. In this way no matter how far away from the track the aircraft might be initially it would only be turned in accordance with the manner of operation of the apparatus in response to the displacement signal until it made with the track an angle at which the heading signal becomes equal to the limit placed on the displacement signal. This angle at which the limited displacement signal becomes equal to the heading signal may be referred to as the characteristic angle of the apparatus.

Thus, if an aircraft incorporating this form of apparatus is initially a long distance away from the ground track, the effect, in operation, is to cause the aircraft to turn towards the track and to pursue a more or less straight line path at a substantially constant heading making with the ground track the said characteristic angle until it reaches a predetermined distance from the track at which the displacement signal provided by the radio apparatus becomes less than the limit value imposed on the displacement signal. From then onwards the flight path becomes an asymptotic approach to the ground track. This predetermined heading angle made between the direction of flight of the aircraft and the direction along the track that the aircraft is finally to pursue is hereinafter referred to as the "angle of approach." Thus the angle of approach is equal to the characteristic angle of the system at which the heading signal becomes equal to the limited displacement signal.

However, the proposal made in the known apparatus referred to has the disadvantage that the angle of initial approach cannot in practice safely be made much larger than 60°. The reason is that if the characteristic angle of the apparatus at which the heading signal becomes equal to the limited displacement signal is made some larger angle, such as 80°, so that the angle of approach is 80°, then if the aircraft should be temporarily yawed from this heading so as to make an angle of 85° or 90° with the ground track, the heading signal which in the apparatus proposed is proportional to the sine of the heading angle is practically unaltered and there is, therefore, no definite change in the resultant control signal that operates to correct the yaw. Furthermore, the margin between the heading signal at 90° and the limited displacement signal which will then correspond to the heading signal obtained at 80° will be so small that it could not be guaranteed that changes in parts of the apparatus, such as amplifiers or limiting devices, would not result in disappearance of the margin altogether.

There are circumstances in which an angle of approach in the neighbourhood of 60° is not satisfactory and it may be desirable to have an angle of approach approximating to 90° or even greater than 90°. For example, in the case where the defined ground track is a localiser path associated with a landing beam leading to a runway on a landing field, it may be desired that it should be possible to switch the apparatus into operation on the aircraft when the aircraft is at any point within a certain region defined by marker beacons in the vicinity of the landing field and it may be that for at least some of the points within this region the path that would be followed in accordance with apparatus providing for a 60° angle of approach with the localiser path would bring the aircraft into the localiser path at a point too far along the localiser path for the aircraft to be capable of executing a successful landing on the runway, whereas paths making a 90° or obtuse angle of approach with the localiser path would satisfactorily bring the aircraft to a point on the track from which a successful landing could be executed.

It is accordingly the object of the present invention to provide improvements in apparatus of the kind referred to in which not only is an aircraft controlled in accordance with the apparatus free from liability to execute complete circles at large distances from the track but also the aircraft is enable to make an angle of approach equal to 90° or greater than 90° if desired.

According to the present invention there is provided aircraft navigational aid apparatus for use in enabling an aircraft to be steered manually or automatically to approach and follow a ground track defined by radio means external to the aircraft and operating by virtue of the fact that a resultant control signal, for use in determining in what sense the aircraft is to be turned, is derived in the apparatus as the combination of various control signals including a displacement-signal that is generated as a measure of the lateral displacement of the aircraft from the ground track and a heading-deviation signal that is generated as a measure of the angular deviation of the heading of the aircraft from a predetermined direction lying in the general direction of the ground track, for example, in a direction set at an angle to the direction of the ground track appropriate to compensate for drift due to side wind, and wherein means is provided for varying or controlling the magnitude of the displacement-signal, characterised in that the magnitude of the displacement-signal is varied or controlled in such a manner, and the heading-deviation signal generator generates the heading-deviation signal in such a manner, that the displacement-signal is always greater than the heading-deviation signal for heading-deviation angles smaller than a characteristic angle in the vicinity of 90° and is thereafter smaller than the heading-deviation signal for heading-deviation angles throughout a zone extending considerably beyond 90°, that is, by appreciably more than the difference between the said characteristic angle and 90°.

Other objects and advantages of the present invention will become apparent from the following specification and drawings in which:

Fig. 2 illustrates curves useful in explaining the operation of the apparatus illustrated in Fig. 1;

Fig. 3 is a schematic view of another embodiment of the present invention;

Fig. 4 is a view similar to Fig. 2 illustrating curves useful in explaining the operation of the embodiment illustrated in Fig. 3;

Figure 1:
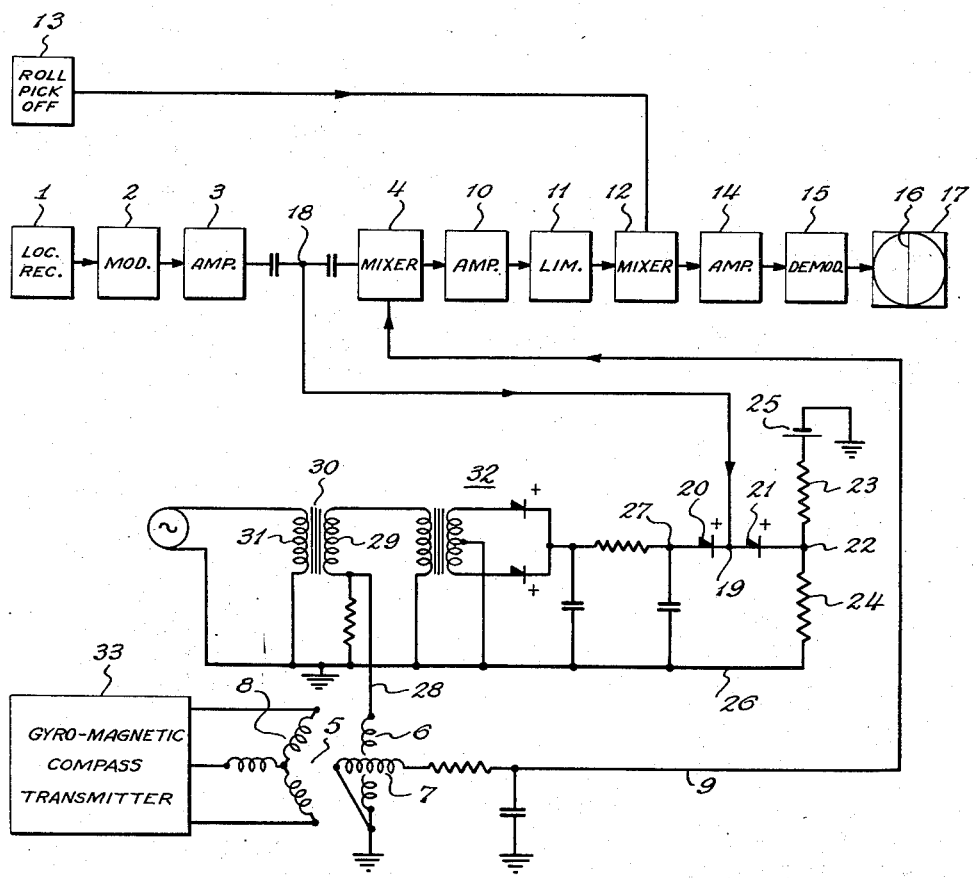
Fig. 1 is a schematic view of an indicating apparatus constructed in accordance with a preferred embodiment of the present invention.

The embodiment of the invention shown in Fig. 1 illustrates, schematically, an indicating apparatus for use in an aircraft by means of which the aircraft may be steered manually to approach and follow a ground track defined by radio means external to the aircraft. Referring to the drawing a localiser receiver 1 mounted in the aircraft is responsive to radio signals received from a radio transmitter on the ground and provides a D. C. signal voltage which is a measure of the lateral displacement of the aircraft from a ground track defined by the external radio means. This D. C. voltage is supplied to a modulator 2 which serves to provide a corresponding A. C. voltage to an amplifier 3. The output of the amplifier 3 is supplied, after being varied and controlled in a manner to be hereinafter described in greater detail, to a mixer 4 which serves to combine in the proper sense the A. C. voltage representing the displacement of the aircraft from the ground track with an A. C. voltage representing the angular deviation in azimuth of the aircraft from a predetermined direction normally parallel to the direction of the ground track but preferably off-set from this direction if there is a cross-wind. This heading-deviation voltage is derived from a signal generator 5 energised from a signal-transmitter 33 associated with a heading-defining instrument, not shown, such as a gyro-magnetic compass. The signal generator 5 is of the selsyn type but its rotor comprises two windings 6 and 7 at right angles to each other. The heading-deviation signal is obtained from the winding 7 which, if the aircraft is heading in the predetermined direction is positioned at right angles to a field generated in the selsyn stator 8 by the selsyn transmitter. If the aircraft departs from the predetermined direction the field in the stator 8 will be rotated through a corresponding amount and an A. C. voltage will be generated in the winding 7 proportional to the sine of the angle that the winding makes with the field in the stator 8, that is, proportional to the sine of the angular-deviation of the aircraft from the predetermined direction. This signal is supplied along the lead 9 to the mixer 4 in which, as has been stated, it is combined with the A. C. voltage representing the aircraft's displacement from the ground track. Reference will later be made in greater detail to the rotor winding 6.

The resultant signal voltage from the mixer 4 is amplified in the amplifier 10, passed through a limiter 11 which prevents the resultant voltage from exceeding a predetermined magnitude and then combined in a mixer 12 with a signal voltage, proportional to the angle of bank of the aircraft, derived from a pick-off device 13 associated with a vertical-defining instrument, not shown, such as a gyro-vertical. The resultant voltage from the mixer 12 is amplified in the amplifier 14 and passed to a demodulator 15 which derives therefrom a corresponding D. C. voltage. This D. C. voltage serves to control the position of a pointer 16 of an indicating instrument 17. The pointer 16 is a vertical pointer adapted to move to the left or right of a zero reference index to indicate to the pilot of the aircraft that a change of attitude of the aircraft is required.

As has been pointed out the arrangement is such that if the aircraft is steered by the pilot in such a manner that the pointer 16 is maintained at its zero position relative to the reference index the aircraft will continuously change its heading until it reaches the ground track and will thereafter proceed along the ground track.

As has been pointed out in the opening paragraphs it is necessary that the signal representing the displacement of the aircraft from the predetermined ground track should be limited in some manner or another. A proposal has been made for limiting or controlling this signal in a particular manner, namely that its maximum value should never exceed the maximum value of the signal measuring the angular deviation in azimuth of the aircraft from a predetermined heading. The present invention proposes other more advantageous forms of limiting or controlling the displacement signal. One of these forms is shown in Fig. 1 and it functions as follows.

The lead connecting the amplifier 3 and the mixer 4 is connected from the point 18 to a point 19 between two series-connected rectifiers 20, 21. The other side of the rectifier 21 is connected to a point 22 between two resistos 23, 24 located in a lead between a source of fixed potential 25 and earth 26. In this way the point 22 remains at a fixed potential. The other side of the rectifier 20 is connected to a point 27 at which is generated a potential whose magnitude depends on the heading of the aircraft with respect to the ground track but which never exceeds the magnitude of the fixed potential. The positive potential at 27 is obtained from the winding 6 of the signal generator 5 in a manner now to be described in greater detail.

As has been stated the winding 6 is at right angles to the winding 7 so that when the aircraft is heading in the predetermined direction the field in the stator 8 will be substantially parallel to the axis of the winding 6 so that an A. C. voltage of maximum amplitude will be generated therein. If the aircraft is headed in a direction at right angles to the predetermined direction the field in the stator 8 will be rotated through 90° so that it is at right angles to the winding 6 and no signal will be generated in the winding 6. If the aircraft turns still further so that it is heading in a direction opposite to the predetermined direction an A. C. voltage will be generated in the winding 6 which will have a maximum negative value. The amplitude of the signal generated in the winding 6 is, therefore, the cosine of the angular deviation of the aircraft from the predetermined direction.

The output voltage from the winding 6 is supplied along the lead 28 to the secondary winding 29 of a transformer 30. The primary winding 31 of the transformer is supplied with an A. C. reference voltage of the same frequency as the signal generated in the winding 6. The phases of the windings 29 and 6 and the magnitude of the voltage generated in the winding 29 due to the energisation of the primary winding 31 are such that when the winding 6 has its maximum positive output, that is, when the aircraft is heading in the predetermined direction the voltage from the winding 6 is equal and opposite to the voltage in the winding 29 and no resultant output is obtained from the secondary winding 29. When the aircraft is at 90° to the predetermined direction the voltage generated in the winding 29 is that due solely to the energisation of the primary winding 31 since the output from the winding 6 is zero, and when the aircraft is headed in a direction opposite to the predetermined direction the sense of the signal from the winding 6 will be reversed and the output from the secondary winding 29 will be double that due to the primary winding 31. It will thus be seen that an A. C. voltage will be generated in the secondary winding 29 which increases from zero amplitude to a maximum value as the aircraft changes its heading from the predetermined direction to a direction opposite to the predetermined direction.

The output from the secondary winding 29 is supplied to the full-wave rectifier and smoothing circuit generally shown at 32 the output from which is substantially a D. C. voltage which increases from zero to a maximum value with change of heading-deviation angle from 0° to 180°. This D. C. voltage appears at the point 27.

The limiting device formed of the rectifiers 20, 21 is of well known type and effectively serves to limit or vary the amplitude of the A. C. voltage derived from the amplifier 3 to a value substantially half of the difference between the reference potential at the point 22 and the varying potential at the point 27. Thus when the voltage at the point 27 is at zero, that is, when the aircraft is flying along the predetermined direction, the amplitude of the A. C. voltage from the amplifier 3 will be at its maximum value and, as the voltage at 27 increases as the aircraft turns away from the predetermined direction to head towards the track, the maximum amplitude that the A. C. voltage from the amplifier 3 can attain decreases in value. The magnitude of the potential at the point 22 is so chosen that the maximum amplitude that the voltage from the amplifier 3 can attain is equal to the amplitude of the heading-deviation voltage for any desired heading-deviation angle, that is, the desired characteristic angle. For example, if an angle of approach of 90° is desired, the voltage at 22 is arranged to have a value such that the maximum value that the amplitude of the displacement-signal can attain is equal to the amplitude of the heading signal at 90°. Thereafter the maximum amplitude of the displacement-signal decreases as the heading-deviation signal decreases.

In other words the rectifiers 20, 21 form a variable impedance means connected between the amplifier 3 and the mixer 4 for attenuating the displacement signal applied at the point 19 through resistance 24 to ground. The conductance of the rectifiers 20, 21 is controlled or varied by the voltages at points 27 and 22, the magnitude of which are dependent upon deviations in the heading of the craft from the bearing of the radio beam, and the selected angle of approach of the craft toward said beam, respectively.

In Fig. 2 there is shown a curve of the limiting value of the displacement signal plotted as a function of the heading-deviation angle measured from the zero of the heading signal. It will be noted that this curve has a falling characteristic. It will also be noted that this curve is arranged to cross the curve of the output of the winding 7, as shown by the dashed curve, at an angle in the vicinity of 90°, preferably between 90° and 120°, which angle becomes the characteristic angle of the system, and to have a falling characteristic for an appreciable range of angles above this characteristic angle. In the present embodiment the curve is arranged to lie below the curve of the output of the winding 7 for all heading-deviation angles greater than the characteristic angle up to the vicinity of 180°.

It is to be appreciated that the voltage induced in the secondary winding 29 need not be equal and opposite to the voltage generated in the winding 6 for zero heading, but that it may be chosen to suit particular requirements.

In Fig. 3 there is shown another embodiment of the present invention in which rectifiers 20, 21 and resistances 23, 24 in the embodiment illustrated in Fig. 1 are eliminated and the D. C. voltage generated at point 27 is utilized to vary the amplification factor or gain of the amplifying valve 35 of amplifier 3 in such a manner that the limiting voltage generated at point 27 has no effect on the amplifier until the heading of the craft has deviated to an angle, say, in the vicinity of 90°, but thereafter sharply to reduce the amplifier gain until the heading angle has reached say 120°. Thus, in this embodiment, the approach angle of the craft to the radio beam can be a selected angle greater than 90° and in the particular case shown in Fig. 4 will be an angle between 90° and 120°, approximately 105°. The manner in which the limit imposed upon the radio signal is varied is illustrated by the curve of Fig. 4 in which the value of the radio signal is plotted as a function of the heading deviation angle, together with a curve representing the value of the heading deviation signal also plotted as a function of heading deviation angle. It will be noted that the curve representing the limited heading signal crosses the curve representing the heading deviation signal at an angle of approximately 105° which angle, for this particular case, is the characteristic angle of the system. The means by which the radio signal is limited as a function of heading deviation angle is illustrated in Fig. 3. As shown therein, the voltage appearing at point 27, which, as above stated, increases from zero to some predetermined maximum value for heading deviations from 0 to 180° is applied to the grid of a direct coupled stage 36 which operates as a voltage inverter, the output being connected to the grid of a triode amplifier tube 35 of the amplifier 3 in the radio signal amplifier channel. Amplifier 3 is a conventional A. C. amplifier and may be of the general type illustrated in the above-identified Kellogg Patent No. 2,613,350. Due to the operation of inverter 36, the bias voltage on the grid of amplifier tube 35 is made to become more negative as the heading deviation signal at point 27 increases beyond a threshold value determined by the conduction of tube 36, thus decreasing the amplification factor or gain of tube 35. For example, the values of the circuit components in the stages including tubes 35 and 36 may be chosen or selected such that when the heading deviation reaches an angle say of 90°, the signal then obtaining at point 27 will cause the tube 36 to conduct and thereby increase the negative bias of tube 35, that is, to cause the bias to become more negative and thus reduce the gain of the tube. As the heading deviation angle increases beyond 90° the negative bias becomes more and more negative thereby further reducing the gain of tube 35. Thus, in accordance with the teachings of the present invention, the angle of approach angle to the radio beam may be an angle in the vicinity of 90° or even an angle greater than 90° depending upon the point at which the curve representing the heading signal is adjusted to cross the curve representing the heading deviation signal.

Figure 5:
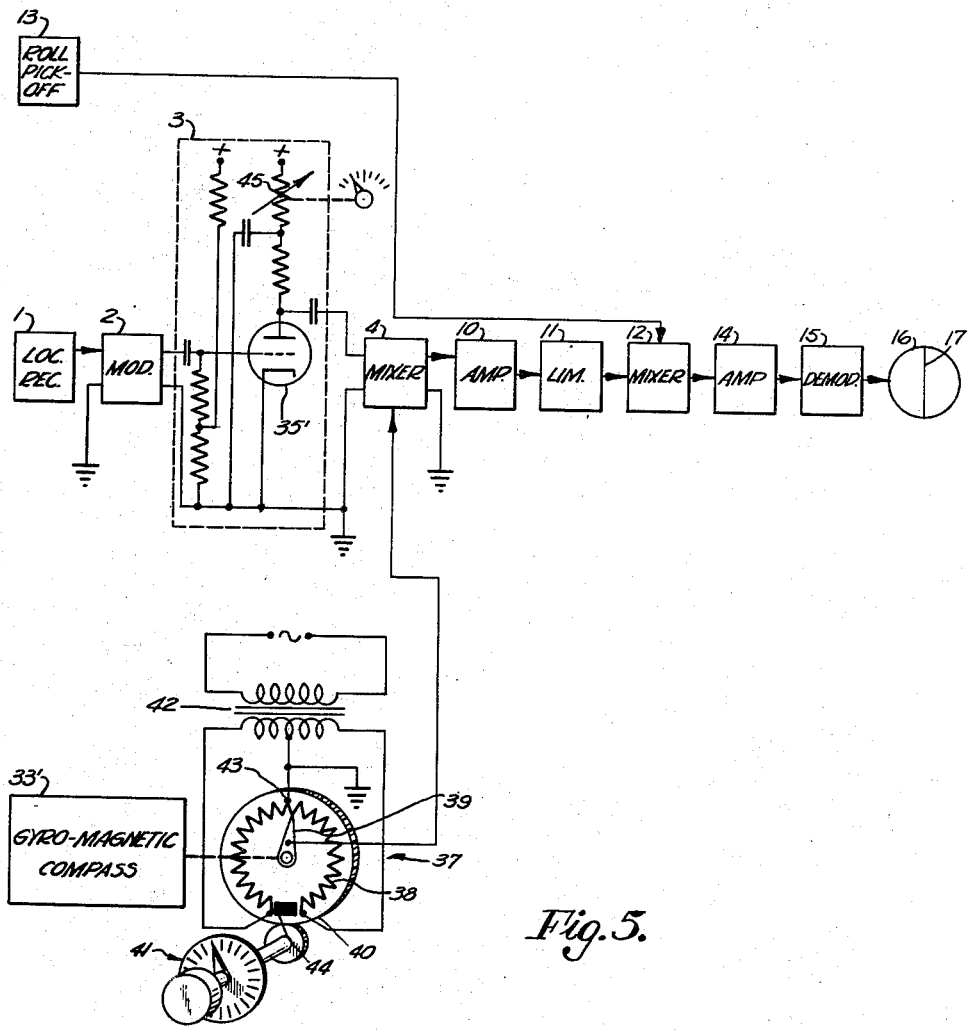
Fig. 5 is a view similar to Fig. 3 illustrating still another embodiment of the present invention.
Figure 6:
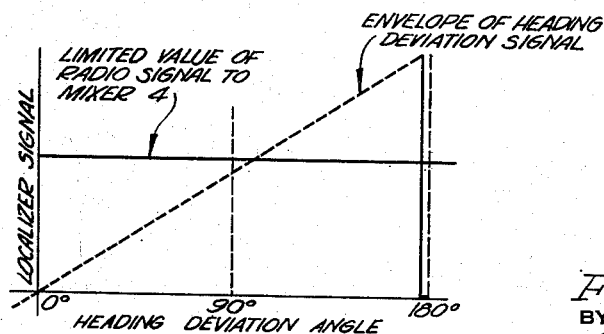
Fig. 6 is a view similar to Fig. 4 illustrating curves useful in explaining the operation of the embodiment of the invention illustrated in Fig. 5.

Another embodiment of the present invention is illustrated in Fig. 5 wherein a potentiometer is employed for producing a heading deviation signal which increases progressively from zero to a maximum value as the heading deviation angle increases from 0° to 180° on each side of the bearing of the radio course, and this deviation signal is used as the heading deviation signal for controlling the vertical pointer 16 of the indicator 17. For this purpose, potentiometer 37 is provided which comprises a winding 38 and a wiper 39, the winding 38 being mounted in a housing or case 40 which may be positioned to the bearing of the selected radio course as by means of dial and settable knob 41. The wiper 39 in turn is coupled or adapted to be connected with gyromagnetic compass 33' in a conventional manner, as, for example, in U. S. Patent No. 2,602,611 to Glenny, issued July 8, 1952. Potentiometer winding 38 is energized by means of suitable source of alternating current through transformer 42, the center tap of the secondary winding thereof being connected with a mid point 43 on potentiometer winding 38 which point is adjusted to correspond to the bearing of the radio beam by means of knob 41. The insulating portion 44 separates the ends of potentiometer winding 38. Thus, when the aircraft heading corresponds to the bearing of the radio beam, the output of potentiometer wiper 39 will be zero but for deviations on either side of the selected heading the output from wiper 39 will be a phase-sensitive A. C. voltage which increases progressively from zero to a maximum value as the heading deviation angle increases from 0° to substantially 180°. The envelope of the heading signal for deviations in one direction from a selected heading is illustrated, as an example, by the dashed line curve of Fig. 6. However, in this embodiment, the radio displacement voltage is limited to a selected value equal to that provided by the heading deviation signal generator when a heading corresponding to the desired characteristic angle obtains. For this purpose, the tube 35' of radio signal amplifier 3 is connected to operate as an amplifier-limiter in the manner set forth in the above-identified Kellogg Patent No. 2,613,350. The limit imposed on the radio displacement signal is made selectively adjustable by controlling the plate voltage of tube 35' through a suitable adjustable potentiometer 45 which in turn controls the saturation point of the tube 35'. Thus, by adjusting the potentiometer 45, the radio signal may be limited to a value determined by the value of the heading deviation signal when the heading deviation reaches a desired characteristic angle, which angle may be any angle between 90° and substantially 180°. In other words, in this embodiment of the present invention the output of amplifier tube 35' remains constant, that is, it does not increase with increases in the radio signal in excess of a selected value as determined by a desired characteristic angle of the system. For illustrative purposes, curves representing the value of the heading deviation signal and the limited value of the radio signal, both curves being plotted as a function of the heading deviation angle, are shown in Fig. 6. It will be noted that the value of the radio signal supplied to mixer 4 is limited to a value such that it will equal the value of the heading deviation signal when the heading deviation angle is approximately 105°, this angle, then, being the desired characteristic angle of the system, in this specific example. The desired characteristic angle may conveniently be selected by providing potentiometer 45 with a dial suitably calibrated in terms of desired characteristic angles.

I claim:

1. In a control system for enabling a craft to approach and to thereafter maintain the course defined by a radio beam, means for providing a signal proportional to the displacement of said craft from said course, means for providing a signal dependent upon deviations in the heading of said craft relative to the bearing of said course, combining means connected to receive said signals for supplying an output proportional to the algebraic sum thereof, means for limiting said displacement signal whereby to control the angle of approach of said craft to said course when operated in accordance with said output, and means for controlling the limits imposed on said displacement signal as a function of the deviation of said craft from the bearing of said course.

2. A control system for enabling a craft to approach a radio beam at some preselected angle of approach and to thereafter maintain the course defined by said radio beam, said system comprising means for providing a signal proportional to the displacement of said craft from said course, means for providing a signal dependent upon deviations in the heading of said craft relative to the bearing of said course, combining means connected to receive said signals for supplying an output proportional to the algebraic sum thereof, means for limiting said displacement signal whereby to control the angle of approach of said craft to said course when operated in accordance with said output, and means for controlling the limits imposed on said displacement signal as a function of the deviation of said craft from the bearing of said course in such a fashion that the magnitude of said displacement signal exceeds that of said heading deviation signal for values of heading deviations less than a preselected angle of approach of said craft toward said course while the magnitude of said heading deviation signal exceeds that of said displacement signal for values of heading deviations of said craft greater than said selected angle of approach, said displacement signal and said heading deviation signal being equal at said selected angle of approach.

3. In a control system for enabling a craft to approach a radio beam at a preselected angle of approach and to thereafter maintain the course defined by said radio beam, means for providing a signal proportional to the displacement of said craft from said course, means for providing a signal dependent upon deviations in the heading of said craft relative to the bearing of said course, combining means connected to receive said signals for supplying an output proportional to the algebraic sum thereof, variable impedance means for limiting the magnitude of the displacement signal supplied to the combining means whereby to control the angle of approach of said craft to said course when operated in accordance with said output, and means for controlling the effective impedance of said impedance means in accordance with deviations in the heading of said craft from the bearing of said course.

4. A control system for enabling a craft to approach a radio beam at some preselected angle and to thereafter maintain the course defined by said radio beam, said system comprising means for providing a signal proportional to the displacement of said craft from said course, means for providing a signal dependent upon deviations in the heading of said craft relative to the bearing of said course, combining means connected to receive said signals for supplying an output proportional to the algebraic sum thereof, variable impedance means connected between said displacement signal source and said combining means for limiting the maximum value said displacement signal can attain whereby to control the angle of approach of said craft to said course when operated in accordance with said output, means for varying the impedance of said impedance means in accordance with deviations in the heading of said craft from the bearing of said course, and means for further controlling said impedance means in accordance with said preselected angle of approach such that the magnitude of said displacement signal supplied to said combining means equals said heading deviation signal supplied to said combining means when the craft is approaching said course at said preselected angle.

5. A control system for enabling a craft to approach a radio beam at a preselected angle of approach and to thereafter maintain the course defined by said radio beam, said system comprising means for providing a signal proportional to the displacement of said craft from said course, means for providing a signal dependent upon deviations in the heading of said craft relative to the bearing of said course, combining means connected to receive said signals for supplying an output proportional to the algebraic sum thereof, and means for controlling the magnitude of said displacement signal supplied to said combining means in accordance with deviations in the heading of said craft from the bearing of said course in such a fashion that the radio signal so supplied to said combining means is at a maximum value for zero values of said heading deviation signal while the radio signal so supplied to said combining means is progressively reduced as the heading deviation signal increases.

6. A control system for enabling a craft to approach a radio beam at a preselected angle of approach and to thereafter maintain the course defined by said radio beam, said system comprising means for providing a signal proportional to the displacement of said craft from said course, means for providing a signal dependent upon deviations in the heading of said craft relative to the bearing of said course, combining means connected to receive said signals for supplying an output proportional to the algebraic sum thereof, means for controlling the magnitude of said displacement signal supplied to said combining means in accordance with deviations in the heading of said craft from the bearing of said course in such a fashion that the radio signal so supplied to said combining means is at a maximum value for zero values of said heading deviation signal while the radio signal so supplied to said combining means is progressively reduced as the heading deviation signal increases, and means for further controlling the magnitude of said displacement signal in accordance with said selected angle of approach such that the magnitude of said displacement signal supplied to said combining means equals the heading deviation signal supplied to said combining means when the craft is approaching said course at said preselected angle.

7. A control system of the character set forth in claim 6 wherein said heading deviation signal controlling said displacement signal varies as a cosine function of angular deviations in the heading of said craft from the bearing of said course.

8. In a control system for enabling a craft to approach and to thereafter maintain a course defined by a radio beam, means for providing a signal proportional to the displacement of said craft from said course, means for providing a signal dependent upon deviations in the heading of said craft relative to the bearing of said course, combining means connected to receive said signals for supplying an output proportional to the algebraic sum thereof, and means for attenuating said displacement signal in accordance with variations in the deviations of the heading of said craft from the bearing of said course.

9. In a control system for enabling a craft to approach a radio beam at a preselected approach angle and to thereafter maintain the course defined by said radio beam, means for providing a signal proportional to the displacement of said craft from said course, means for providing a signal dependent upon deviations in the heading of said craft relative to the bearing of said course, combining means connected to receive said signals for supplying an output proportional to the algebraic sum thereof, variable impedance means having one end thereof connected both to said displacement signal source and to said combining means for attenuating said displacement signal, and means for controlling said variable impedance means in accordance with deviations in the heading of said craft from the bearing of said course.

10. A control system for enabling a craft to approach a radio beam at a preselected approach angle and to thereafter maintain the course defined by said radio beam, said system comprising means for providing a signal proportional to the displacement of said craft from said course, means for providing a signal dependent upon deviations in the heading of said craft relative to the bearing of said course, combining means connected to receive said signals for supplying an output proportional to the algebraic sum thereof, variable impedance means having one end thereof connected both to said displacement signal source and to said combining means for attenuating said displacement signal, means for controlling said variable impedance means in accordance with deviations in the heading of said craft from the bearing of said course, and means for further controlling said impedance means in accordance with said preselected angle of approach such that the magnitude of said displacement signal supplied to said combining means equals said heading deviation signal supplied to said combining means when the craft is approaching said course at said preselected angle.

11. In a control system for enabling a craft to approach a radio beam at some preselected angle of approach and to thereafter maintain the course defined by said radio beam, means for providing a signal proportional to the displacement of said craft from said course, means for providing a signal dependent upon deviations in the heading of said craft relative to the bearing of said course, combining means connected to receive said signals for supplying an output proportional to the algebraic sum thereof, rectifier means having one end thereof connected both to said displacement signal source and to said combining means for attenuating said displacement signal, and means for controlling the conductance of said rectifier means in accordance with deviations in the heading of said craft from the bearing of said course.

12. In a control system for enabling a craft to approach a radio beam at some preselected angle of approach and to thereafter maintain the course defined by said radio beam, means for providing a signal proportional to the displacement of said craft from said course, means for providing a signal dependent upon deviations in the heading of said craft relative to the bearing of said course, combining means connected to receive said signals for supplying an output proportional to the algebraic sum thereof, rectifier means having one end thereof connected both to said displacement signal source and to said combining means for attenuating said displacement signal, and means for controlling the conductance of said rectifier means in accordance with deviations in the heading of said craft from the bearing of said course, and means for biasing said rectifier means, the magnitude of said bias corresponding to the selected angle of approach of said craft to said course.

13. In a control system for enabling a craft to approach a radio course at some preselected angle of approach and to thereafter maintain the course defined by said radio beam, means for providing a signal proportional to the displacement of said craft from said course, means for providing a signal dependent upon deviations in the heading of the craft relative to the bearing of said course, combining means connected to receive said signals for supplying an output proportional to the algebraic sum thereof, variable coupling means for supplying said displacement signal to said combining means, a first control voltage source connected to control said coupling means so as to vary the displacement signal input to said combining means in dependence upon deviations in the heading of said craft from the bearing of said course, and a second control voltage source connected to control said coupling means so as to adjust the order of magnitude of said displacement signal supplied to the input of said combining means.

14. A control system of the character set forth in claim 13 wherein the variable coupling means comprises a pair of series-connected rectifiers having said displacement signal source connected to a point therebetween, said first control voltage source being connected to one end of said series-connected rectifiers for controlling the potential thereat and said second control voltage source being connected to the other end of said series-connected rectifiers for controlling the potential thereat whereby the conductance of said pair of rectifiers is dependent upon the sum of said first and second control voltages.

15. A control system for enabling a craft to approach and thereafter maintain a course defined by a radio beam, means for providing a signal proportional to the displacement of said craft from said radio beam, means for supplying a signal having a magnitude depending upon deviations in the heading of said craft from the bearing of said radio beam, said heading deviation signal increasing progressively from a minimum value at zero degrees heading deviation to a maximum value at a heading deviation of substantially 180°, and selectively controllable displacement signal limiting means so constructed and arranged that the amplitude of said limited displacement signal is equal to the amplitude of a heading deviation signal corresponding to any chosen magnitude of heading deviation between 0° and 180°.

16. A control system for enabling a craft to approach and to thereafter maintain the course defined by a radio beam, said system comprising means for providing a signal proportional to the displacement of said craft from said course, amplifying means connected to receive said displacement signal for supplying an output signal proportional to an amplified version thereof, means for providing a signal dependent upon deviations in the heading of said craft relative to the bearing of said course, combining means connected to receive said amplified displacement signal and said deviation signal for supplying an output proportional to the algebraic sum thereof, and means for controlling the gain of said amplifier as a function of the deviation of said craft from the bearing of said course, whereby to limit the magnitude of said amplified displacement signal as a function of the deviation of said craft from the bearing of said course.

17. A control system for enabling a craft to approach and thereafter maintain a course defined by a radio beam, said system comprising means for providing a signal proportional to the displacement of said craft from said radio beam, means for supplying a signal corresponding to deviations in the heading of said craft from the bearing of said radio beam, said heading deviation signal increasing progressively from a minimum value at zero degrees heading deviation to a maximum value at a heading deviation of substantially 180°, displacement signal limiting means, means for selectively controlling the limit imposed on said displacement signal in dependence upon a desired angle of approach of said craft toward said radio beam between 0° and 180°, and means responsive to said limited displacement signal and said heading signal for supplying an output proportional to the algebraic sum thereof.

References Cited in the file of this patent

UNITED STATES PATENTS

| | | |
|---|---|---|
| 1,958,258 | Alexanderson | May 8, 1934 |
| 2,279,031 | Cockerell et al. | Apr. 7, 1942 |
| 2,402,378 | Davies | June 18, 1946 |
| 2,415,430 | Frische et al. | Feb. 11, 1947 |
| 2,424,079 | Dome | July 15, 1947 |
| 2,613,352 | Kellogg | Oct. 7, 1952 |

FOREIGN PATENTS

| | | |
|---|---|---|
| 516,567 | Great Britain | Jan. 5, 1940 |